Figure 2:
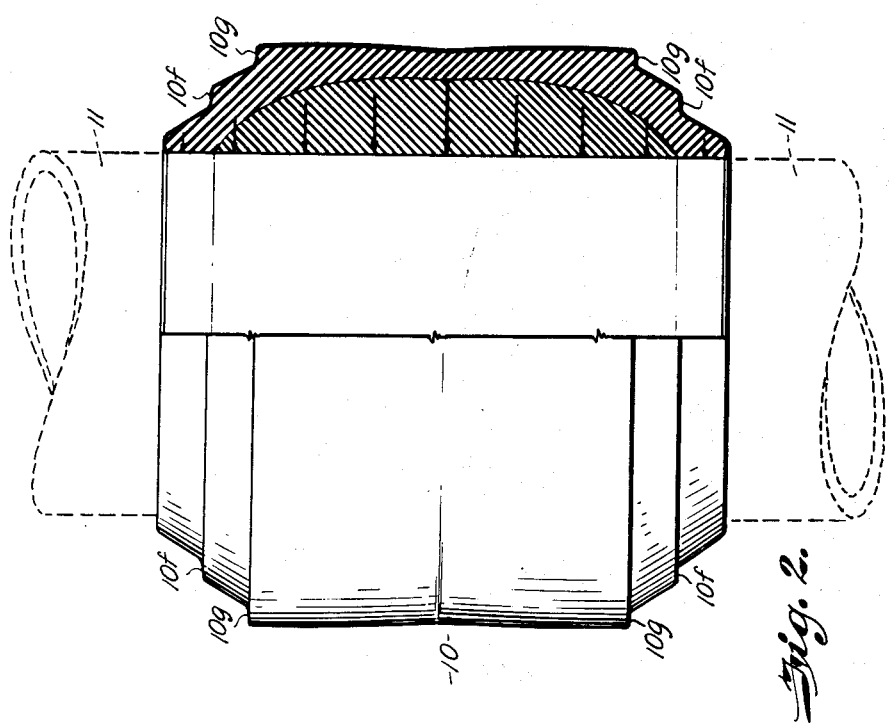

Nov. 3, 1953  J. E. HALL, SR  2,657,956
DRILL PIPE PROTECTOR
Filed Aug. 15, 1949

INVENTOR.
Jesse E. Hall, Sr.
BY
ATTORNEY.

Patented Nov. 3, 1953

2,657,956

UNITED STATES PATENT OFFICE 2,657,956

DRILL PIPE PROTECTOR

Jesse E. Hall, Sr., Weatherford, Tex., assignor of ten per cent to Parker Industrial Products, Inc., Weatherford, Tex., a corporation of Texas Application August 15, 1949, Serial No. 110,279

7 Claims. (Cl. 308—4)

This invention relates to improvements in rubber protectors for drill pipe and refers more particularly to a protector having a laminated rubber wall, the inner lamination of natural rubber or a blend composed principally of natural rubber and the other lamination of synthetic rubber.

This application is an improvement over the invention disclosed in a prior Patent No. 2,299,978 dated August 27, 1942.

In the drilling of oil wells it is conventional practice to apply to the string of drill pipe adjacent the tool joints or couplings rubber protectors whose inside diameter is less than that of the outside diameter of the drill pipe. The protectors are applied by expanding the rubber with an applicator tool sufficiently to pass them over the joints and then releasing the protectors onto the pipe where the elasticity of the rubber is relied upon to hold the rubber protectors in place.

Since the protectors are subjected to considerable abuse while serving as a bearing between the rotating drill pipe and the inside of the casing or the abrasive formations of the well bore, it is essential that they have two important qualities, first, they must be formed of a rubber mixture which has great elastic strength and second they must have a high degree of wearability, toughness or resistance to tear or splitting. Elasticity is required to give the rubber sufficient stretch to be applied to the pipe. Wearability and toughness are essential qualities since the ends and outer surface of the rubber are constantly subjected to abrasion and the likelihood of being cut or torn from contact with sharp surfaces of the earth's formations in which the pipe rotates and the hard metal surface or obstructions and protrusions within the casing. Surface wear is also occasioned by the swirling and abrasive effect of the drilling mud which contains not only the lubricant in the form of clay or other argillaceous and siliceous substances but also cuttings loosened during the drilling operation and suspended in the mud in the form of sharp particles.

An object of the invention, therefore, is to provide a protector which has improved elasticity without sacrificing toughness and wearing ability.

Another object is to provide a protector which has greater contractive gripping power resisting movement of the protector after placement upon the pipe.

A further object is to provide a protector which has a maximum stretchability consistent with resistance to abrasive wear and tendency to tear.

Another object is to provide a protector made up of an inner lamination principally of natural rubber which furnishes the gripping surface against the outside of the pipe and an outer synthetic rubber lamination furnishing the wearing surface, said laminations bonded together into an integral unit by vulcanizing.

Other and further objects of the invention will appear from the description which follows.

In the accompanying drawings which form a part of the specification and are to be read in conjunction therewith like reference numerals are used to indicate like parts in the various views.

Figure 1:
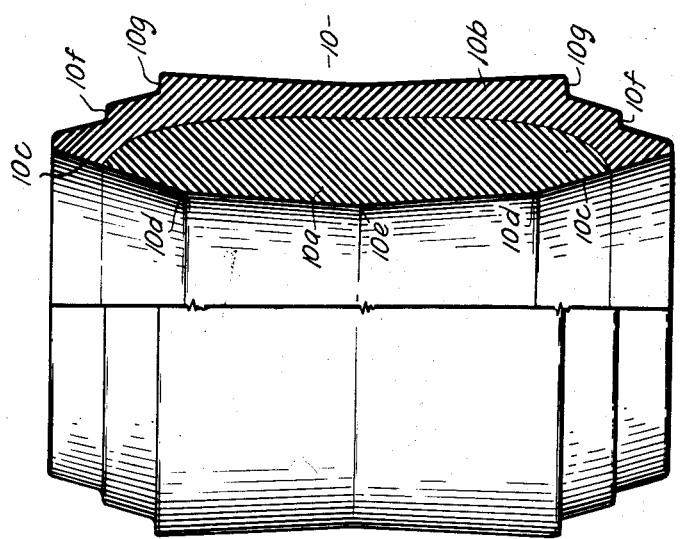

Fig. 1 is a side elevational view of a protector embodying the invention with parts in section, and Fig. 2 is a like view showing the protector expanded and applied to a drill pipe.

Referring to the drawings, at 10 is shown a protector having an inner lamination 10a of rubber, composed principally of natural rubber or entirely of natural rubber into which has been worked carbon black to give the rubber improved strength and durability. Vulcanized to the inner lamination 10a is an outer lamination of synthetic rubber 10b also having incorporated therein carbon black to give the synthetic product improved texture, strength and durability.

In the manufacture of the protector a sleeve of natural rubber is inserted within a larger sleeve of synthetic rubber and the two annular sleeves or laminations are placed in the mold with a central core or mandrel and subjected to a vulcanizing temperature at which the inner and outer laminations are bonded into a unitary structure as shown in Fig. 1. It is necessary during vulcanization and molding to properly vent the sections of the mold in order that the laminations be kept of uniform thickness.

The pipe gripping surface or passageway through the protector is tapered to enlarge the hole at top and bottom. The taper from the opposite ends is relatively steep for a short distance, designated by the numeral 10c and is more gradual from the rings or shoulders 10d to the central or circumferential ring 10e. The outer surface of the protector in an unexpanded condition as shown in Fig. 1 has two steps or shoulders 10f and 10g near its ends. The outer surface of the protector between the inner shoulders or steps 10g is tapered slightly toward the center producing a relatively uniform wall thickness. The wall thickness is however designed to apply at the center with decreasing compressive forces imposed toward the outer edges as indicated by the weight of the arrows in Fig. 2. Since the greatest constrictive force is applied at the center of the rubber due to the design of the protector wall the greatest tension is at the center and less at the ends reducing to a minimum the tendency of the end edges of the rubber to split, crack, rent or tear when it abuts a sharp surface or object.

When expanded on a pipe 11, as shown in Fig. 2, the abruptness and contour of the end steps or ridges are considerably streamlined offering a riffle surface for the well fluids which produce a certain amount of eddying and minimizes wear at the ends of the protector.

Thus it will be seen that there has been provided a protector with increased strength and durability shaped so the maximum gripping force is applied near its center and decreasing toward the ends. By laminating synthetic and natural rubber in the form of concentric sleeves there has been provided a protector which has increased gripping qualities and considerably improved exposed wearing surfaces.

As many possible embodiments may be made of the invention it is understood that all matter herein set forth or shown in the accompanying drawings is to be interpreted as illustrative and not in a limiting sense.

Certain features and subcombinations are of utility and may be employed without reference to other features and subcombinations. This is contemplated by and is within the scope of the claims.

Having thus described my invention, I claim:

1. In a drill pipe protector, a generally cylindrical body of rubber-like elastic material having a central bore, said bore being circular in transverse cross section and, in the normal unstressed condition of said body, being tapered axially so its side walls converge from each end of the body all of the way to the center thereof, whereby said bore is smallest in diameter at its midpoint and, at any point spaced axially from the midpoint, is smaller in diameter than it is at any other point spaced farther from said midpoint, said body comprising inner and outer tubular laminations formed of different kinds of rubber bonded together, the inner lamination being shorter than said body and its bore forming the medial portion of the bore of said body, the outer lamination covering the inner lamination, including the ends thereof, and having end bores aligned and contiguous with the bore of the inner lamination to form the end portions of the bore of said body.

2. A protector as in claim 1 wherein the inner lamination is formed of natural rubber and the outer lamination is formed of synthetic rubber.

3. In a drill pipe protector, a cylindriform body having a central bore, said body comprising inner and outer tubular laminae formed respectively of different kinds of rubber bonded together, the outer lamina being longer than the inner lamina and having both ends projecting beyond the corresponding ends of the inner lamina, said projecting ends of the outer lamina extending inwardly over the ends of the inner lamina so that only the bore of the inner tubular lamina is exposed.

4. In a protector for a drill pipe, an elastic rubber collar stretchable to encircle the drill pipe, the central bore of said collar normally being smaller than the drill pipe whereby the walls of said bore are in firm engagement with the pipe when the collar is mounted thereon, a sleeve formed of a different kind of rubber covering and bonded to the entire peripheral and end surfaces of said collar that are exposed when same is on a drill pipe, said sleeve having end apertures normally smaller in size than the diameter of said pipe whereby they firmly engage the wall of the pipe beyond the bore of said collar when said protector is mounted on the pipe.

5. A protector as in claim 4 wherein said collar is formed of natural rubber and said sleeve is formed of synthetic rubber.

6. In a drill pipe protector, a generally cylindrical body of rubber-like elastic material having a central bore of circular cross section, said bore, in the normal unstressed condition of said body, having its smallest diameter at a point midway between the ends of the body and flaring axially toward both ends, the flare being continuous throughout the full distance from said midpoint to each end, the exterior surface of said body being concentric with said bore and in the normal unstressed condition of the body also flaring axially from said midpoint toward both ends, the rate of said axial flare of the exterior surface being less than the rate of axial flare of the bore, whereby the wall thickness of the body is greatest at said midpoint and diminishes progressively in an axial direction outwardly from said midpoint, the flare of said exterior surface terminating short of the ends of said body and merging into a tapered exterior surface portion which converges toward the ends of the body.

7. A drill pipe protector as in claim 6 wherein the rate of axial flare of said bore is greater near the ends of the bore than near the center, said flare of the bore increasing sharply in approximately the same region that the flare of the exterior surface terminates and merges into said converging surface portion.

JESSE E. HALL, Sr.

References Cited in the file of this patent

UNITED STATES PATENTS

| Number | Name | Date |
|---|---|---|
| 831,143 | Conrader | Sept. 18, 1906 |
| 1,640,744 | Zapf | Aug. 30, 1927 |
| 1,814,183 | Patterson | July 14, 1931 |
| 1,854,339 | Lamb | Apr. 19, 1932 |
| 1,863,823 | Barclay | June 21, 1932 |
| 2,259,023 | Clark | Oct. 14, 1941 |
| 2,299,978 | Hall | Oct. 27, 1942 |
| 2,308,147 | Ballagh | Jan. 12, 1943 |
| 2,318,878 | Miller | May 11, 1943 |
| 2,604,365 | Howard | July 22, 1952 |